United States Patent [19]

Carlson

[11] 4,309,230
[45] Jan. 5, 1982

[54] PROCESS FOR REPRODUCIBLY PREPARING TITANIUM SUBHYDRIDE

[75] Inventor: Richard S. Carlson, West Alexandria, Ohio

[73] Assignee: The United States of America as represented by the United States Department of Energy, Washington, D.C.

[21] Appl. No.: 155,028

[22] Filed: May 30, 1980

[51] Int. Cl.$^3$ .................... C06B 43/00; C01G 23/00
[52] U.S. Cl. .................. 149/109.6; 149/77; 149/87; 423/645
[58] Field of Search .............. 423/645; 149/87, 120, 149/109.6, 77

[56] References Cited

U.S. PATENT DOCUMENTS 3,180,711  4/1965  Aconsky ........................ 423/645
3,376,107  4/1968  Oka ............................. 423/645

OTHER PUBLICATIONS

Lieberman, "Chemical Abstracts", vol. 90, 1979, #124081(e).
Gibb et al., "Journal of American Chemical Society", vol. 72, 1950, pp. 5365-5369.

Primary Examiner—Herbert T. Carter
Attorney, Agent, or Firm—George H. Libman; Albert Sopp; Richard G. Besha

[57]  ABSTRACT

Titanium subhydride is produced in a reactor by heating a selected amount of finely divided titanium compound at a selected temperature for a selected period of time under dynamic vacuum conditions. Hydrogen is removed substantially uniformly from each powder grain and there is produced a subhydride of substantially uniform titanium-hydrogen composition. Selection of the amount, temperature and time produces a subhydride of selected titanium-hydrogen composition.

10 Claims, No Drawings

PROCESS FOR REPRODUCIBLY PREPARING TITANIUM SUBHYDRIDE

The United States Government has rights in this invention pursuant to contract number EY-76-C-04-0053 between the United States Department of Energy and Monsanto Research Corp., Miamisburg, Ohio (41CFRS9-9.109-6(i) (5) (ii) (B)).

BACKGROUND OF THE INVENTION

This invention relates to the preparation of a subhydride of titanium. More particularly, this invention relates to the preparation of a titanium subhydride of a selected titanium-hydrogen composition, the subhydride being of substantially uniform titanium-hydrogen composition.

In the prior art, it is known to prepare titanium subhydride for the purpose of developing pressure/temperature/composition diagrams. In this work, stoichiometric titanium hydride is heated under equilibrium vacuum conditions to a certain temperature, hydrogen gas coming off the titanium material is captured and the volume of the gas is measured. Illustrative of this type of prior art is Gibb, Jr. et al, "The Titanium-Hydrogen System and Titanium Hydride. I. Low-Pressure Studies", *Journal of the American Chemical Society*, Vol. 72, pp. 5365–5369 (1950). In this particular prior art reference, stoichiometric titanium hydride is evacuated briefly at 200°–300° C., following which pure hydrogen is obtained as needed by heating to above 500° C. Also in this reference, the dissociation pressure was measured for the Ti-H system over the range 500°–800° C. at 50–800 mm. Also, it is known in the prior art to prepare fine powder of metals such as titanium using stoichiometric titanium hydride starting material by heating the starting material at a temperature higher than 500° C. in a vacuum of $5 \times 10^{-5}$ mm. Hg. Prior art of this type is exemplified by U.S. Pat. No. 3,376,107 to Oka.

This prior art and the other prior art of which I am aware is deficient since it fails to provide a process for reproducibly preparing titanium subhydride of a selected titanium-hydrogen composition. Also, this prior art fails to provide a process for producing a titanium subhydride of substantially uniform titanium-hydrogen composition. Furthermore, this art does not provide a process for providing a subhydride of substantially uniform titanium-hydrogen composition that is in the form of free-flowing, dust-free spheres of friable powder. Moreover, this art does not provide a process of the type described in which there is a minimum of sintering of the titanium starting material and of the subhydride.

SUMMARY OF THE INVENTION

It is accordingly one object of the present invention to provide a process for reproducibly preparing titanium subhydride of a selected titanium-hydrogen composition.

A further object is to provide a process for preparing titanium subhydride of a substantially uniform titanium-hydrogen composition.

A still further object is to provide a process for preparing titanium subhydride of a substantially uniform titanium-hydrogen composition that is in the form of free-flowing, dust-free spheres of friable powder.

An even further object is to provide a process for preparing a titanium subhydride of the type described above in which there is a minimum of sintering of the titanium starting material and of the subhydride produced.

Additional objects, advantages and novel features of the invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing objects and in accordance with the purpose of the present invention, as embodied and broadly described herein, the process of this invention includes the steps of heating a selected amount of finely powdered $TiH_2$ at a selected temperature for a selected period of time under dynamic vacuum conditions in a reactor as a result of which hydrogen is removed substantially uniformly from each powder grain and there is produced titanium subhydride of a selected titanium-hydrogen composition. This subhydride is of substantially uniform titanium-hydrogen composition. The temperature is in the range of about 375°–475° C. and the time is from about 1–24 hours. The vacuum conditions constantly remove hydrogen from the reactor. Following production of the titanium subhydride, the subhydride is recovered. Optionally, the resulting titanium subhydride is treated with a passivating amount of a suitable gas to render the titanium subhydride non-pyroforic. Also provided, is a titanium subhydride having the approximate titanium-hydrogen composition $TiH_{0.63}$ to $TiH_{0.67}$. In addition, there is provided titanium subhydride having the approximate titanium-hydrogen composition $TiH_{0.60}$ to $TiH_{0.66}$, the subhydride being in the form of free-flowing, dust-free spheres of friable powder having a size of about 0.5 to 2.0 micrometers. These titanium subhydrides, and all titanium subhydrides produced by my process are of substantially uniform titanium-hydrogen composition. Broadly speaking, there is provided a titanium subhydride of a selected and substantially uniform titanium-hydrogen composition. This titanium subhydride may have any selected titanium-hydrogen stoichiometry so long as less than one mole of hydrogen are present for each mole of titanium.

DETAILED DESCRIPTION OF THE INVENTION

As explained above, in accordance with the invention, there is provided a process for reproducibly preparing titanium subhydride of a selected titanium-hydrogen composition. The subhydride is of substantially uniform titanium-hydrogen composition. This process removes hydrogen substantially uniformly from each powder grain of the titanium compound starting material. The starting material is in a finely powdered form.

In the first essential step of my process, a selected amount of the starting material is heated in a reactor under certain conditions as a result of which hydrogen is removed substantially uniformly from each powder grain and a subhydride in accordance with the invention is produced. Broadly, these conditions are a selected temperature, a selected period of time and the use of dynamic vacuum conditions. The temperature is in the range of about 375° C. to 475° C., the period of time is about 1–24 hours, and the dynamic vacuum conditions constantly remove hydrogen from the reactor.

The titanium compound starting material is TiH$_2$. TiH$_2$ is referred to as stoichiometric titanium hydride or titanium dihydride throughout this description. Alternatively, the titanium compound may be a titanium subhydride having a hydrogen composition greater than the desired hydrogen composition but less than one mole of hydrogen per one mole of titanium.

A convenient temperature for carrying out my process is in the range of about 425° to 450° C. The dynamic vacuum conditions suitably produce an observed final subatmospheric pressure of between about 515 to 640 μm Hg*. The dynamic vacuum conditions are in contrast to the equilibrium vacuum conditions used in prior art work. In this work, titanium dihydride was heated to a certain temperature, the hydrogen gas coming off the titanium dihydride was captured, and the volume of this gas measured for the purpose of calculating the stoichiometry of the resultant titanium compound. This work was done in order to develop a pressure/temperature/composition diagram. However, in my process, I constantly remove hydrogen from the reactor so that the resultant material never comes to equilibrium.

*when a subhydride having the approximate composition of about TiH$_{0.60}$ to TiH$_{0.70}$ is produced. When the composition is below this range, then the observed final subatmospheric pressure is less, and conversely.

In the second essential step of my process, the titanium subhydride produced is recovered. This involves the use of conventional procedures. Optionally, my process further includes the step of treating the recovered titanium subhydride with a passivating amount of a suitable gas such as air. Small additions of air are used in this step to render the subhydride non-pyroforic. The titanium subhydride is either cool or still hot when passivated, with it being advantageous for it to be cool. The resulting non-pyroforic titanium subhydride is then recovered. This titanium subhydride has a selected titanium-hydrogen composition and is substantially uniform in the titanium-hydrogen composition. Also, this subhydride, as well as the subhydride that is not passivated, has about 50% or more of the surface area of the starting material.

Suitably, in the first essential step of my process, the titanium compound is heated in a static reactor and it is particularly suitable to use a rotating reactor. The static reactor is, for example, a cylindrical tube with a heat flow-controlling extension welded to one end thereof. The open end of the cylindrical tube is provided with a flange and mating cover that provides a gas-tight seal. An exemplary reactor of this type is about 26 inches long with about a 6-inch long heat-flow controlling extension. The tube has a tray-supporting assembly for supporting trays into which the titanium compound is placed. The titanium compound powder has a depth from about 0.5 to 1.0 cm in these trays. The powder depth is substantially uniform throughout all the trays in the reactor so that a product of substantially uniform composition is produced. A depth greater than about 1.0 cm interferes with substantially uniform hydrogen removal from each powder grain. When about 150 g of finely powdered titanium compound is placed in this static reactor at a temperature in the range of about 435°–442° C. for about 20 hours, there is produced a titanium subhydride in accordance with my invention ranging from about TiH$_{0.57}$ to TiH$_{0.675}$. Holding these other parameters constant, a temperature of about 435° C. produces a titanium subhydride having the approximate composition TiH$_{0.675}$, and a temperature of about 442° C. produces a titanium subhydride having the approximate composition TiH$_{0.57}$. In each of these cases, as with all titanium subhydrides produced by my process, the titanium-hydrogen composition is substantially uniform.

The rotating reactor is conveniently also a cylindrical tube with a heat flow-controlling extension welded to one end thereof and with the open end being provided with a flange and mating cover to provide a gas-tight seal. Within this cylindrical tube is a container into which the titanium compound starting material is placed, and within the container are rotating blades that provide for uniform exposure of the starting material to the treatment conditions. The hydrogen gas evolved during the treatment is removed by a vacuum line that extends into the container. A similar vacuum line extends into the static reactor described above. I find the rotating reactor to be more convenient in carrying out my process for reasons that include the ability to prepare a greater quantity of titanium subhydride product. When about 1500 g of starting material is heated at a temperature of about 446° to 447.5° C. for about 20 hours, there is produced a titanium subhydride having a titanium-hydrogen composition ranging from about TiH$_{0.60}$ to TiH$_{0.66}$. This subhydride and all subhydrides prepared in this reactor by my process are in the form of free-flowing, dust-free spheres of friable powder having a size of about 0.5 to 2.0 micrometers. When the temperature is about 446° C. and the other conditions described above are used, the resultant titanium subhydride has the approximate composition TiH$_{0.66}$, and when the temperature is about 447.5° C. and the other conditions are as just described, the resultant titanium subhydride has the approximate composition TiH$_{0.60}$. In each of these two cases, as in the case of all titanium subhydrides produced by my process, the titanium-hydrogen composition is substantially uniform for each and every particle of the titanium subhydride.

When the static reactor described above is used, and the other detailed conditions described above for the static reactor are used, a temperature of from about 437° C. to about 440° C. results in a titanium subhydride having a composition ranging from about TiH$_{0.63}$ to TiH$_{0.67}$. Under these conditions, a temperature of about 440° C. produces the approximate composition TiH$_{0.63}$, and about 437° C. produces a titanium subhydride having the approximate composition TiH$_{0.67}$. A substantial advantage in using the rotating reactor is the production of the subhydride in the form of free-flowing, dust-free spheres. The production of the subhydride in this convenient form was an unexpected event that resulted from our process being carried out in the rotating reactor. Another advantage resulting from our process is that there is a minimum of sintering of the titanium compound and of the subhydride produced.

As explained, my process reproducibly prepares titanium subhydride of a selected titanium-hydrogen composition, the subhydride being of substantially uniform titanium-hydrogen composition. In short, I have discovered that by using a selected amount of finely powdered titanium compound, a selected temperature and a selected period of time under dynamic vacuum conditions that there results a selected titanium subhydride of this type.

The below examples are illustrative of my process and of the titanium subhydride produced by my process. It is to be understood that these examples are not in any way to be interpreted as limiting the scope of the invention. Rather, it is intended that the scope of the invention be defined by the claims appended hereto.

EXAMPLES 1-6

Using the static reactor described with particularity above, and stoichiometric titanium hydride as the starting material, the titanium compound is heated at the temperature and for the length of time shown in Table 1 to produce a titanium subhydride of the composition shown. Also shown is the number of grams of starting material.

EXAMPLES 7-14

Following the procedure of the previous examples, a different batch of stoichiometric titanium hydride is used as the starting material. Again, Table 1 shows the temperature, time, composition produced and the amount of starting material.

EXAMPLES 15 and 16

Also following the procedure of the previous examples, a still different batch of stoichiometric titanium hydride is used as the starting material. Once again, Table 1 sets forth the temperature, time, composition produced and the grams of starting material.

EXAMPLES 17 and 18

Using the rotating reactor described with particularity above, another batch of stoichiometric titanium hydride is used as the starting material. The reactor temperature, the time, the composition produced and the grams of starting material are shown in Table 1.

From these examples, it can be clearly seen that I rigorously control the reactor temperature and the time in order to reproducibly prepare titanium subhydride of a selected titanium-hydrogen composition in accordance with my invention. Also from these examples, it can be seen how the batch size affects the resultant titanium-hydrogen composition, with a subhydride being produced that has a lower ratio of hydrogen to titanium when the batch size is smaller than when the batch size is larger. Also, it can be seen that the hydrogen concentration is diminished in the resultant compound as the time is increased.

My process is particularly useful in pyrotechnic formulations. As a result of the reproducibility of my process and of the uniform composition of the batches that I produce, the titanium subhydride I produce has exceptional reliability when used in a pyrotechnic material. One such pyrotechnic system is titanium subhydride-potassium perchlorate. This particular pyrotechnic formulation is useful in the production of valve actuator assemblies.

In the rotating reactor described with particularity above, the container into which the titanium compound starting material is placed, is provided with three chevron vanes welded to a removable support bracket which is placed inside and rotates with the container. The chevron blades uniformly stir and move the powder toward the center of the container during rotation. In operation, the rotating reactor is sealed, evacuated for several hours while rotating and then my process is carried out. Also, the reactor is cooled or allowed to cool in a reproducible fashion after the heating step. Reactor rotation is constant and slow, less than 5 rpm. Similarly, when the static reactor is used, cooling of the reactor or allowing of the reactor to cool is carried out in a reproducible fashion. In the use of both these reactors, the vacuum is produced by a conventional vacuum pump. The use of three chevron vanes in the rotating reactor is a matter of convenience, since a greater number of vanes could be used. Both the static reactor and rotating reactor are enclosed in a three-zone tube furnace, such as the Lindberg furnace.

In carrying out my process, the surface area of the starting material, typically about 2-4 square meters per gram, is not reduced by more than about 50%. The surface area of the subhydride is important for use of the subhydride in pyrotechnic compositions. As an alternative to treating the subhydride with a passivating gas, such as air, other gases may be selected for treating the subhydride in order to confer desired properties, such as reduced spark sensitivity or enhanced resistance or reactivity to chemical attack. Depending upon the property desired, the subhydride may be treated, for example, with carbon monoxide, ammonia, sulfur dioxide, oxides of nitrogen, halogens, hydrogen chloride, hydrogen cyanide and various organic gases, such as methane or acetylene.

TABLE 1

| Example | Batch Size (g) | Composition | Reactor Temperature °C. | Length of Time During Which Gas Was Withdrawn From Reactor |
|---|---|---|---|---|
| 1 | 15 | $TiH_{0.030}$ | 449.8 | 20.0 hr |
| 2 | 15 | $TiH_{0.623}$ | 403.2 | 20.0 hr |
| 3 | 15 | $TiH_{1.026}$ | 380.8 | 20.0 hr |
| 4 | 150 | $TiH_{1.202}$ | 380.5 | 20.0 hr |
| 5 | 150 | $TiH_{1.043}$ | 406.7 | 20.0 hr |
| 6 | 150 | $TiH_{0.347}$ | 459.0 | 20.0 hr |
| 7 | 150 | $TiH_{0.640}$ | 438.5 | 20.0 hr |
| 8 | 150 | $TiH_{0.470}$ | 454.8 | 20.0 hr |
| 9 | 150 | $TiH_{0.340}$ | 471.0 | 20.0 hr 15 min |
| 10 | 80 | $TiH_{1.440}$ | 399.8 | 3 hr 35 min |
| 11 | 80 | $TiH_{1.600}$ | 381.8 | 3 hr 00 min |
| 12 | 80 | $TiH_{1.110}$ | 454.6 | 4 hr 08 min |
| 13 | 150 | $TiH_{0.640}$ | 439.0 | 21 hr 00 min |
| 14 | 150 | $TiH_{0.630}$ | 440.0 | 19 hr 55 min |
| 15 | 150 | $TiH_{0.675}$ | 435.5 | 20.0 hr |
| 16 | 150 | $TiH_{0.570}$ | 441.2 | 20.0 hr |
| 17 | 1500 | $TiH_{0.66}$ | 446.1* | 20 hr 12 min |
| 18 | 1500 | $TiH_{0.60}$ | 447.4* | 20 hr 00 min |

*Average of eight thermocouples.

What is claimed is:

1. A process for reproducibly preparing a titanium subhydride of the formula $TiH_x$ having a substantially uniform titanium-hydrogen composition, from an original titanium-hydrogen composition of the formula $TiH_y$, wherein $x < y \leq 2$, said process comprising the steps of:
   (a) in a reactor, heating a quantity of finely powdered $TiH_y$ at a selected temperature in the range of about 375° to 475° C. for a selected period of time of from about 1 to 24 hours, under dynamic vacuum conditions that constantly allow removal of hydrogen from said reactor, whereby hydrogen is removed substantially uniformly from each original powder grain of $TiH_y$ to produce the $TiH_x$ subhydride, and
   (b) recovering said $TiH_x$ subhydride.

2. The process of claim 1 further comprising the steps of
   (c) treating the recovered titanium subhydride with a passivating gas selected from the group consisting of air, carbon monoxide, ammonia, sulfur dioxide, nitrogen oxides, halogens, hydrogen cyanide, methane, and acetylene, and
   (d) recovering non-pyrophoric titanium subhydride.

3. The process of claim 2, wherein said titanium subhydride is passivated after cooling.

4. The process of claim 1 wherein said selected temperature is in the range of about 425° to 450° C.

5. The process of claim 1 wherein the reactor is a static reactor and the original titanium-hydrogen composition is finely powdered $TiH_2$ spread at a depth in the range of from about 0.5 to 1.0 cm.

6. The process of claim 5 wherein said quantity of finely powdered $TiH_2$ is about 150 g, said selected temperature is in the range of about 435° to 442° C., said selected period of time is about 20 hours, and the titanium-hydrogen composition of said titanium subhydride ranges from about $TiH_{0.57}$ to $TiH_{0.675}$.

7. The process of claim 6, wherein said selected temperature is from about 437° C. to 440° C., and the titanium-hydrogen composition of said titanium subhydride ranges from about $TiH_{0.63}$ to $TiH_{0.67}$.

8. The process of claim 1 wherein the reactor is a rotating reactor, the original titanium-hydrogen composition is finely powdered $TiH_2$ and the subhydride obtained is in the form of free-flowing, dust-free spheres of friable powder that have a diameter of about 0.5 to 2.0 micrometers.

9. The process of claim 8, wherein quantity of finely powdered $TiH_2$ is about 1500 g, wherein said selected temperature is about 446° to 447.5° C., wherein said selected period of time is about 20 hours, and wherein the titanium-hydrogen composition of said titanium subhydride ranged from about $TiH_{0.60}$ to $TiH_{0.66}$.

10. The process of claim 1, wherein a final subatmospheric pressure of between about 515 to 640 μm Hg is observed, when a composition of about $TiH_{0.60}$ to $TiH_{0.70}$ is produced.

* * * * *